April 26, 1932. F. BIGGS 1,856,060
WINDOW FOR AUTOMOBILES
Filed Aug. 14, 1930 2 Sheets-Sheet 1

INVENTOR
Frank Biggs
BY
Gill & Jennings
ATTORNEY

April 26, 1932.   F. BIGGS   1,856,060
WINDOW FOR AUTOMOBILES
Filed Aug. 14, 1930   2 Sheets-Sheet 2

INVENTOR
Frank Biggs
BY
Gill & Jennings
ATTORNEYS.

Patented Apr. 26, 1932

1,856,060

UNITED STATES PATENT OFFICE

FRANK BIGGS, OF LONDON, ENGLAND, ASSIGNOR OF ONE-HALF TO LOWE, BEVAN AND COMPANY, LIMITED, OF BIRMINGHAM, ENGLAND, A COMPANY OF GREAT BRITAIN

WINDOW FOR AUTOMOBILES

Application filed August 14, 1930, Serial No. 475,262, and in Great Britain May 17, 1930.

This invention relates to vertically slidable or drop windows for motor road vehicles, and has particular reference to such windows for closed motor vehicles by means of which the usual hand signals may be given by the driver or any other occupant of the vehicle to following or approaching traffic without the necessity of opening the whole of the window by the driver's seat. The invention is particularly concerned with windows for automobiles of the kind having a hinged section which can be opened to provide an opening for the driver's hand.

The main aim of the invention is to provide relatively simple means for automatically closing the signalling flap if an attempt is made to lower the window into the door while the flap is swung open and to effect this without rendering the means for retaining the flap open more complicated.

With this object in view, according to the present invention, use is made of an abutment fixed within the body of the motor vehicle, into engagement with which the pivoted flap comes when the window is moved downwardly, with the result that the flap is first of all swung back into the plane of the window and can then safely be lowered into the door together with the window. The invention is particularly adaptable to windows in which the lower part constitutes the signalling flap and for that purpose is arranged to be swung outwardly about horizontal pivots when pushed manually from within the vehicle. Such a flap may be embraced along its lateral edges by channel members, a portion of each of which extends within the pivot when the flap is swung outwardly, and an abutment is conveniently provided on opposite sides of the door so as to be engaged by that inner extension of the channel members when the window is lowered. In order to maintain the flap in the open position, resilient members, such as a pair of tubular barrels containing compression springs and acting as resilient struts, may be employed. Each of these is preferably pivoted at its lower end to one of the vertical side members of the window frame and at its upper end to one of the channel members embracing the lateral edges of the signalling flap at a point which when the flap is open, lies somewhat outside the pivot of the flap.

As an additional security in preventing the window being lowered before the signalling flap has returned into the plane of the window, projecting pieces of metal or catches on the vertical stile which slides down with the whole window are arranged so as to be held up by spring-pressed bolts in the normal position of the latter. When the flap, however, returns into the plane of the window, it is arranged for its side members to push on these spring bolts and cause them to be retracted out of the path of the metal catches, and hence freeing the window to allow the latter to be lowered into the door.

An embodiment of the novel window in accordance with the invention is illustrated in the annexed drawings, wherein:—

Figure 4 is a horizontal section through one side of the window frame on the line IV—IV in Figure 3; while

Figure 1:
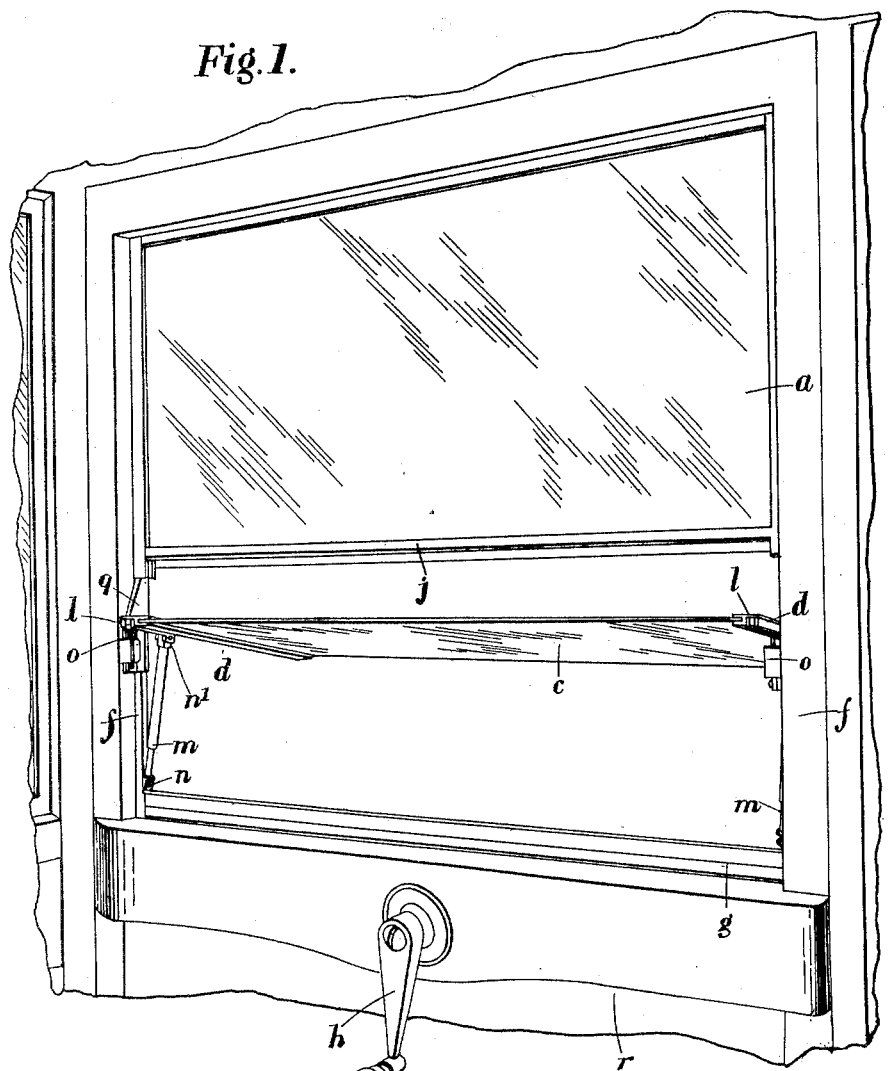
Figure 1 is a perspective view from within a closed motor vehicle showing the driver's window fitted with a horizontally pivoted signalling flap, shown in the open position.

In the embodiment illustrated, the window comprises two pieces of glass, the upper piece of glass $a$ fixed within a metal frame of channel section, shown at $b$, and the lower one $c$ forming the signalling flap and pivoted within the channel frame $b$. For this purpose the signalling flap $c$ has its lateral edges engaged by short channel members $d$ pivoted in the window frame at $e$ in such a way as to swing about these pivots when the lower part of the flap $c$ is pushed manually from inside the vehicle. The flap $c$ then takes up the position shown in Figures 1 and 2. The two upright or side stiles $f$ of the window framework are extended below the normal bottom stile g to provide a fixing for a sub-stile, not shown, but designed to connect with the mechanical lifter as usually provided for doors of closed automobiles. The crank handle for operating the lifting and lowering mechanism is indicated at h in Figure 1.

Figure 2:
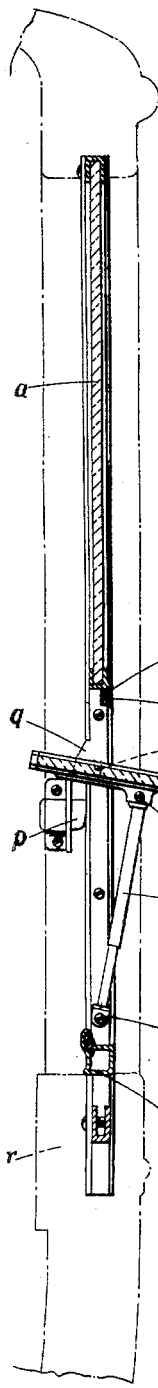
Figure 2 is a vertical section through the window, also with the signalling flap in the open position.
Figure 3:
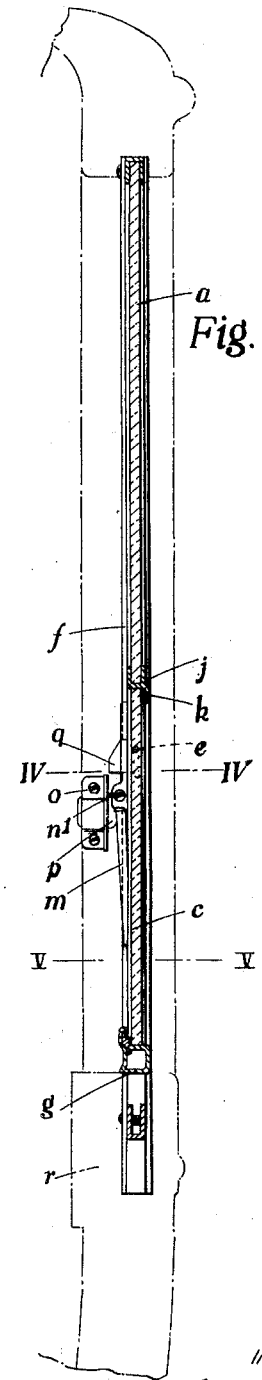
Figure 3 is a similar sectional elevation with the signalling flap swung back into the plane of the window.

Across the window connected to each upright stile f there is a further horizontal stile j which, as seen in Figures 2 and 3, is of channel form on the upper side so that the upper glass a can rest in the channel, and on its under side it has a downwardly projecting rib between which and the top edge of the pivoted signalling flap c a rubber beading k may be provided. This brings the pivoted flap c immediately under and in alinement with the upper glass a. The pivoted flap glass c has its lateral channel holders d provided with pivots at e, as already mentioned, and they are of such a section that while the glass rests in the channel on the inner side of each, on the outer side they have only one extended edge, as seen at l in Figure 1, which is on the outside of the frame, so leaving a vertical space when the flap c is in the closed position, adjacent to the upright stiles f on each side of the frame in which the compression spring barrel m is furnished on either side of the window. Each of these spring barrels is mounted on a pivot pin n at its lower end secured to the upright stile f slightly above, for example, one-half inch above, the bottom stile g, and the spring barrel at its upper end is secured by another pivot pin n' on the side of the short channel member d at a point about five-eighths of an inch, for example, from the main pivot e.

When the window is in the fully raised position as shown in the drawings, the flap is swung open at will by the pressure of the driver's hand against the glass below the pivot e, and to close the flap c it is only necessary to press by hand upon the upper or inner edge of the glass c.

The automatic closing system is provided to guard against the possibility of breaking the glass of the pivoted flap c by thoughtless lowering of the window. This embodies a pair of fittings or abutments o each upon the inside upright door fillets and in such a position that if the flap c is swung open and the window is lowered, the abutments o lie in the path of the inner ends of the channels d. Each of these fittings o is about one and a quarter inches long from top to bottom and about three-eights of an inch thick. It contains a spring, not shown, and a piece of metal forming a bolt p thrust out by the spring into the position shown in Figure 2. The top edge of the box forming this abutment is at such a height that the inner ends of the channels d can engage it when the flap c is swung open, so partly serving as a check limiting the angular outward movement of the flap c under the action of the springs within the barrels m. Thus, initial lowering of the window causes the inner ends of the channels d to press upon the abutments o and as the window continues to be lowered, the flap c is swung as a result about its pivot e until it returns to the plane of the window, as shown in Figure 3.

As a further security, the spring-pressed bolt p is arranged to engage a projecting piece of metal or catch q on the vertical stile f which slides down with the whole window. Thus the spring bolt p arrests a too speedy downward movement of the window, so that after the flap c begins to move into the closed position upon the downward movement of the window, the catch or projection q engages on the top edge of the bolt p and holds up the window until the channel members d and the lateral edges of the flap c abut against the front of the bolts p and cause them to be retracted into their housings, so leaving the path of the catches or projections q clear and freeing the window so that it can continue to descend into the door r.

Figure 5:
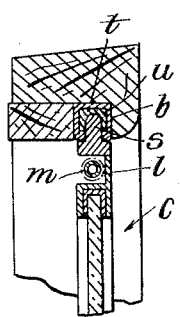
Figure 5 is a horizontal section through one side of the window frame taken approximately on the line V—V in Figure 3.
Figure 4:
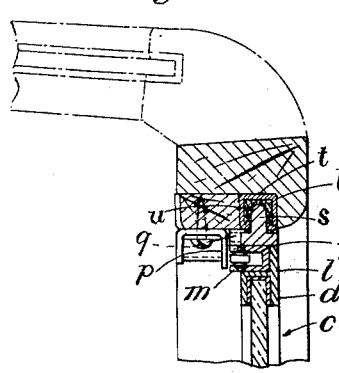

The upright stiles f of the window frame are formed with a rib s (see Figures 4 and 5) designed to run in the channel t lined with felt u in the usual way. Instead of having a metal channel such as that shown at v surrounding the window glasses a and c, the upper glass a may rest in the cross stile j only and comprise a frameless glass, as is in common use.

The channels d may be made with square corners at their bottom or outer ends as shown in the drawings. However, to provide for rounded door corners in the automobile to which they are fitted, the outer surface of the window frame may be made with a hollow round corner at each side at the bottom with a corresponding rounded corner on the bottom corners of the glass of the flap c. Furthermore, where the glass run or runs are at an angle, as is the case in a vertical body with raked front door pillars, provision is made for this by setting the pivoted members at the required angles.

I claim:—

1. In a closed motor road vehicle, the combination of a vertically slidable window including a pivoted flap mounted to swing outwardly into the open position when pushed manually from the inside of the vehicle, an abutment fixed with respect to the framework of said vehicle and located so as to lie in the path of a portion of said flap when said window is lowered in order to cause said flap to turn into the plane of the window, and means for resiliently retaining said flap in the open position.

2. In a closed motor road vehicle, the combination of a vertically slidable window therein including a pivoted signalling flap forming the lower end of said window and mounted to swing outwardly into the open position about a horizontal axis when pushed manually from the inside of the vehicle, an abutment fixed with respect to the framework of said vehicle and located so as to lie in the path of a portion of said flap when said window is lowered in order to cause said flap to turn into the plane of the window, and means for resiliently retaining said flap in the open position.

3. In a closed motor road vehicle, the combination of a vertically slidable window including a pivoted signalling flap forming the lower end of said window and mounted to swing outwardly into the open position when manually pushed from the inside of the vehicle, a pair of spring barrels each pivoted at one end to said window frame and at the other end to a part of said flap at such a point as to retain said signalling flap in the open position, and an abutment secured to the fixed framework of said window within the vehicle so as to lie in the path of the inner and upper end of said flap when said window is lowered in order to cause said flap to be swung back into the plane of said window.

4. In a closed motor road vehicle, the combination of a window framework, a window vertically slidable therein and comprising an upper portion constrained to remain vertical and a lower signalling flap, said signalling flap having channel members embracing its lateral edges and each formed with a horizontal pivot engaging journals in the frame of said window, a pair of abutments secured to said vehicle in position to lie in the path of the upper and inner ends of said channel members when said window is lowered in order to swing back said signalling flap from the open position into the plane of said window, and resilient means for retaining said signalling flap in the open position.

5. In a closed motor road vehicle, the combination of a vertically slidable window including a pivoted flap mounted to swing outwardly into the open position when manually pushed from the inside of the vehicle, an abutment fixed with respect to the framework of said vehicle and located so as to lie in the path of a portion of said flap when said window is lowered in order to cause said flap to turn into the plane of the window, means for resiliently retaining said flap in the open position, and a horizontally retractable spring bolt mounted on the framework of said vehicle adjacent to said window frame and arranged to engage a catch carried by said window and to be retracted by means of said pivoted flap only when the latter has returned into the plane of said window.

In witness whereof I hereunto subscribe my name this 1st day of August, 1930.

FRANK BIGGS.